(12) United States Patent
Gao et al.

(10) Patent No.: US 8,155,147 B2
(45) Date of Patent: *Apr. 10, 2012

(54) TECHNIQUES FOR ENSURING SYNCHRONIZED PROCESSING AT REMOTE FIBRE CHANNEL AND FIBRE CONNECTIVITY NETWORKS

(75) Inventors: Fang Gao, Rockville, MD (US); Gongyuan Yao, Germantown, MD (US); Ravi Singhal, Herndon, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/621,985

(22) Filed: Nov. 19, 2009

(65) Prior Publication Data

US 2010/0067909 A1 Mar. 18, 2010

Related U.S. Application Data

(63) Continuation of application No. 11/441,484, filed on May 27, 2006, now Pat. No. 7,630,405.

(51) Int. Cl.
*H04J 3/24* (2006.01)
(52) U.S. Cl. .................... 370/473; 370/476
(58) Field of Classification Search .......... 370/476, 370/466, 498, 473
See application file for complete search history.

(56) References Cited

U.S. PATENT DOCUMENTS

| | | | |
|---|---|---|---|
| 7,020,814 B2 | 3/2006 | Ryle et al. | |
| 7,127,653 B1 | 10/2006 | Gorshe | |
| 7,164,860 B1 | 1/2007 | Narvaez et al. | |
| 7,209,445 B2 | 4/2007 | Miller et al. | |
| 7,260,767 B2 | 8/2007 | Bhattacharya et al. | |
| 7,298,694 B2 | 11/2007 | Kamiya et al. | |
| 7,321,600 B2 | 1/2008 | DeCusatis et al. | |
| 2002/0090007 A1* | 7/2002 | Kamiya et al. | 370/476 |
| 2003/0074449 A1 | 4/2003 | Smith et al. | |
| 2004/0252720 A1* | 12/2004 | Xiong et al. | 370/473 |
| 2005/0010849 A1 | 1/2005 | Ryle et al. | |
| 2005/0157648 A1 | 7/2005 | Miller et al. | |
| 2006/0023750 A1 | 2/2006 | Kim et al. | |
| 2006/0171411 A1 | 8/2006 | DeCusatis et al. | |
| 2007/0116046 A1* | 5/2007 | Liu et al. | 370/466 |
| 2007/0248121 A1* | 10/2007 | Zou | 370/498 |

OTHER PUBLICATIONS

"Storage Extension Test Challenges", Agilent Technologies, White Paper, Publisher: Agilent Technologies, Published online (Jan. 19, 2006) Webpage Available at: www.agilent.com/find/santester.

(Continued)

*Primary Examiner* — Kwang B Yao
*Assistant Examiner* — Syed M Bokhari

(57) ABSTRACT

Techniques described use Generic Framing Procedure (GFP) to transport data across an optical transport network between near and far Fiber Channel (FC) or Fiber Connectivity (FICON) local area optical networks. Each FC/FICON edge node (FCE) on an edge of the optical transport network has multiple modes for processing FC/FICON frames transported across the optical transport network. The techniques include receiving, at a near FCE from a far FCE, a GFP control plane message that includes a mode field that holds data that indicates a far mode, wherein the far mode is used at the far FCE. It is determined whether a near mode used by the near FCE matches the far mode based on the mode field. If it is determined that they do not match, then an alert is caused. These techniques allow software to utilize existing GFP chips in FCE that use optional processing, such as distance extension.

19 Claims, 6 Drawing Sheets

OTHER PUBLICATIONS

"Generic Framing Procedure", vol. T1X1/5, American National Standards Institute, Published in: Washington DC, (2000), p. 42.

Devdas, V. et al., "Method and System for Efficient Flow Control for client Data Frames over GFP across a SONET/SOH Transport Path", United States Patent Application Publication, vol. 2005. (1/612005).

Non-Final Office Action for U.S. Appl. No. 11/441,484, mailed on Nov. 28, 2008, 29 pages.

Notice of Allowance for U.S. Appl. No. 11/441,484, mailed on Jul. 28, 2009, 11 pages.

* cited by examiner

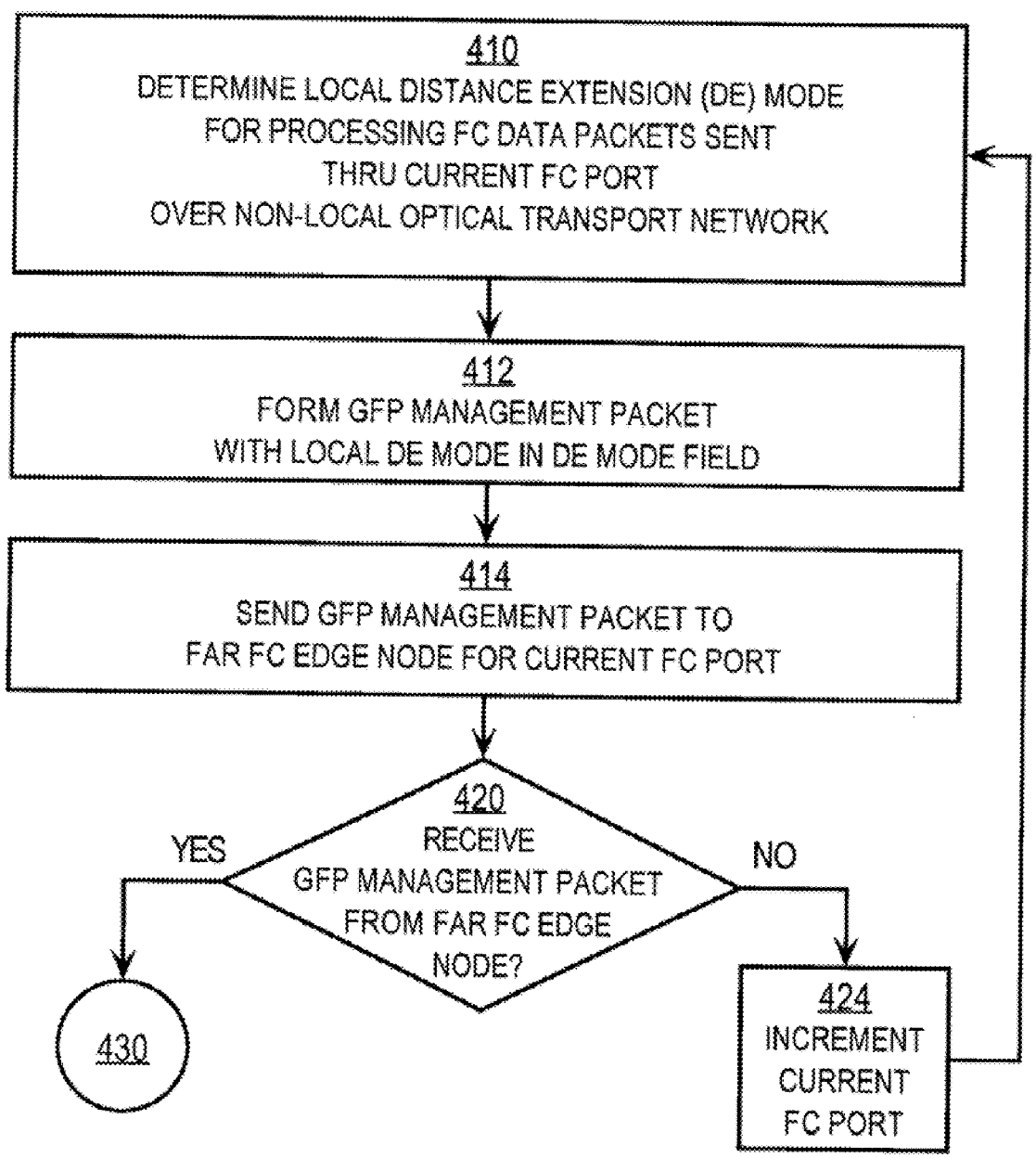

TECHNIQUES FOR ENSURING SYNCHRONIZED PROCESSING AT REMOTE FIBRE CHANNEL AND FIBRE CONNECTIVITY NETWORKS

CROSS-REFERENCE TO RELATED APPLICATION

This application is a continuation of application Ser. No. 11/441,484, filed on May 27, 2006. The subject matter of this earlier filed application is hereby incorporated by reference.

TECHNICAL FIELD

The present invention relates to communicating between Fibre Channel (FC) or Fibre Connectivity (FICON) protocol networks separated by Metro Area Network (MAN) or other Wide Area network (WAN) using the Generic Framing Procedure (GFP); and, in particular, to using GFP control packets to coordinate the use of distance extension at the separated FC/FICON networks.

BACKGROUND

Networks of general purpose computer systems and special devices connected by external communication links are well known. The networks often include one or more network devices that facilitate the passage of information between the computer systems and special devices. A network node is a network device or computer system or other special device connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol. The header for a particular protocol typically indicates a type for the next protocol contained in its payload. The protocol in the payload is said to be encapsulated in the preceding protocol. The portion of a data packet including a header and payload for a particular protocol is also called a packet, a data packet, a frame, a cell, or a message of that protocol. In some publications, these different words are used to distinguish one portion of a data packet from another (e.g., to distinguish a first protocol message, from a second protocol frame), but herein, the terms are used interchangeably.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications. The control plane packets are also called management packets. For example, during establishment of a connection using a protocol, some handshaking procedures at communicating nodes involve sending information back and forth in control plane packets for use by that protocol subsequently when transporting data plane packets.

Optical Fibre has emerged as a preferred link medium for exchanging large amounts of data because of its high bandwidth, low power consumption, and low noise. Because of attenuation of light intensity in optical cable, however, early optical networks were confined to providing high bandwidth connections ("wide pipes") into high volume data storage devices over limited-distances. Such limited-distance optical networks, called herein local-area optical networks, formed a basis for storage area networks (SANs). SANs are heavily used in some businesses, such as financial and banking services, in which data of high value to millions of customers are stored and processed frequently.

Several networking protocols have found use in SANs, including Gigabyte Ethernet, Fibre Channel (FC), Enterprise Systems CONnectivity (ESCON) of IBM™ Armonk, N.Y., and a version of ESCON called Single-Byte Command Code Sets Connection (SBCON) approved by the American National Standards Institute (ANSI), for the command set used by ESCON, known as FC-SB. An updated protocol for faster data throughput at mainframe computers using the same command set is Fibre Connectivity (FICON). The most common SAN technology is Fibre Channel networking (also called Fibre Channel in some publications) with a Small Computer Systems Interface (SCSI) command set.

A typical FC SAN is made up of a number of FC switches which are connected together to form a fabric or network. FC is described in ANSI X3.230-1994, available from domain webstore.ansi.org on the World Wide Web (WWW). The entire contents of ANSI X3.230-1994 are hereby incorporated by reference as if fully set forth herein. FC provides for bi-directional, gigabit-per second, transport in FC data packets (also called "frames") that have a standardized set of bits. FC links are limited by the standard to no more than 10 kilometers (km, $1 \text{ km}=10^3$ meters) to ensure packets are received before drastic attenuation within a certain time interval used to detect, correct and prevent data loss.

One fallout of recent man-made and natural disasters is the recognition that such valuable data is best redundantly distributed at widely geographically spaced locations. Optical networks that span such scales include metropolitan area networks (MANs) and wide area networks (WANs). Optical MANs and WANs have been developed using special optical nodes that repeat and switch optical signals, correcting for attenuation and other signal degradation. Optical protocols for these larger distance networks (including both MANs and WANs) include a Synchronous Optical Network (SONET), Synchronous Digital Hierarchy (SDH) and Optical Transport Network (OTN) protocols.

Several of the SAN protocols however, do not mesh directly with these larger distance optical protocols. For example, FC is limited to maximum distances of 10 kilometers, while SONET networks can span hundreds and thousands of kilometers. In a common approach, FC ports connected by FC links are mapped to SONET or SDH paths for transport across a SONET or SDH optical transport network.

This approach is commonly implemented by encapsulating FC data frames into data packets of a Generic Framing Procedure (GFP). The GFP frames are then encapsulated into the optical transport protocol (e.g., SONET or SDH) for transport across the optical transport network. GFP is described in International Telecommunication Union (ITU), Telecommunication Standardization Sector, Series G: Transmission Systems and Media, Digital Systems and Networks, Series Y: Global Information Infrastructure and Internet Protocol Aspects, Internet Protocol Aspects—Transport, Generic Framing Procedure (ITU-T G.70411Y. 1303), Geneva, Switzerland, December 2001, the entire contents of which are hereby incorporated by reference as if fully set forth herein.

Further refinements have been adopted to make better use of the bandwidth of the optical transport network. The refinement for FC is described in the following paragraphs.

In one mode of operating locally, FC nodes control data flow by requiring a FC control plane acknowledgment (ACK) message be received from the far end node for every FC data packet sent by a near end node. In another local mode used between two linked nodes, a group of data packets can be transmitted before receiving the first control plane acknowledgment. The group size is called a buffer-to-buffer credit (BBC), and the control plane acknowledgement is by a R-Rdy Primitive (READY) signal. For links of 10 km and less, the delay introduced by the round trip of data and ACK message or READY signal is small (on the order of 0.033 milliseconds and less, where 1 millisecond, ms, $=10^{-3}$ second). For links of thousands of miles, this delay can be substantial (over 3 ms). The procedures and buffer sizes designed for the short haul are wasteful of bandwidth on the longer haul. Bandwidth on the optical transport network between SANS goes unused as FC nodes wait for ACK messages or READY signals using procedures designed for shorter distances.

To alleviate the delay and wasted bandwidth, a distance extension processing mode has been introduced at FC nodes on the border between the local SAN and the long-distance, extended area optical transport network. Such nodes are called FC edge nodes hereinafter. According to the distance extension processing mode, the FC edge node devotes extra storage for FC data frames and sends ACK messages and READY signals for all FC data frames directed through the long-distance optical transport network, while the FC edge nodes have room to store those FC data frames. Thus FC nodes on the local FC network receive those ACK messages and READY signals quickly, and continue to send more FC data frames. As a consequence, there is less waiting in the local FC network, and better use is made of available bandwidth over the long-distance or, at least, non-local optical transport network between remote SANs. The distance extension is describe in more detail by V. Devdas et al., "Method and System for Efficient Flow Control for Client Data Frames over GFP across a SONET/SDH Transport Path," in United States Patent Application Publication US2005/0002338, Jan. 6, 2005, the entire contents of which are hereby incorporated by references as if fully set forth herein.

A port on an FC edge node is manually configured to employ the distance extension mode or not. Successful use of the distance extension involves ports on both FC edge nodes at the two remote SANs operating in concert. Therefore, it is important that both FC edge node ports be configured with the same distance extension mode, whether on or off (also termed "enabled" or "disabled," respectively). For example, the BBC might be 32 buffers for FC frames when distance extension is disabled, but substantially larger, say 1024 buffers, when distance extension is enabled. Thus some signaling is useful, whereby the local FC edge node (also called the near FC edge node) notifies the distant or remote FC edge node (called hereinafter the far FC edge node) about the distance extension mode used on the near mode. The original FC Protocol standard, however, did not anticipate this signaling need and does not provide a field in FC frames to specify the distance extension mode used. FC frames are identical for nodes using the distance extension and those not, it is the processing and response to the FC frames that differ.

In several approaches, new values are defined for one or more existing two-byte fields in the GFP header, e.g., the Payload Type ID (PTI) and User Payload ID (UPI). One new value signals DE enabled; and the other signals DE disabled. When the far FC edge node receives the GFP header that indicates the near FC edge node DE mode, the far FC edge node can determine whether the DE mode used by the near FC edge node matches the DE mode used by the corresponding port on the far FC edge node. If the modes do not match, an alert is presented so that a network administrator for the far FC edge node is made aware of the mismatch. Corrective action can then be taken. For example, an FC port is reconfigured, or a connection is made with a different port on the near or far FC edge node that does match.

While suitable in some instances, there are disadvantages with these approaches. One disadvantage arises because the GFP header is typically processed in hardware configured as a GFP chip. That hardware does not recognize the new values defined for some of the fields and ignores GFP frames with those values set. Thus users of these approaches must replace the GFP chip with different hardware, such as a field programmable gate array (FPGA) or new chip from another vendor, or with GFP header software that executes more slowly than hardware. Replacement of multiple GFP chips is costly and can be prohibitive for organizations that have tens to hundreds of FC edge nodes already deployed with the older GFP chips.

Based on the foregoing, there is a clear need for techniques to ensure synchronized processing by remote FC edge nodes separated by an extended area optical transport network that do not suffer one or more disadvantages of prior art approaches. In particular, there is a need to ensure synchronized use of the FC distance extension mode by remote FC edge nodes without replacement of older GFP chips.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A and FIG. 4B constitute a flow diagram that illustrates a method at an FC edge node for ensuring synchronized processing at remote FC networks, according to an embodiment.

DETAILED DESCRIPTION

Techniques are described for ensuring synchronized processing at remote Fibre Channel networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Illustrated embodiments of the invention are described in the context of ensuring synchronized Distance Extension (DE) mode processing at remote Fibre Channel (FC) edge nodes using Generic Framing Procedure (GFP) to transport data across an extended area optical transport network using SONET over OTN. However, the invention is not limited to this context. In other embodiments other current or future FC processing options at remote FC networks communicating FC data frames or FICON frames using GFP over the extended area optical transport network using any number of the same or different, extended-area optical and non-optical transport protocols are ensured of synchronization using these techniques.

1.0 Network Overview

Figure 1:
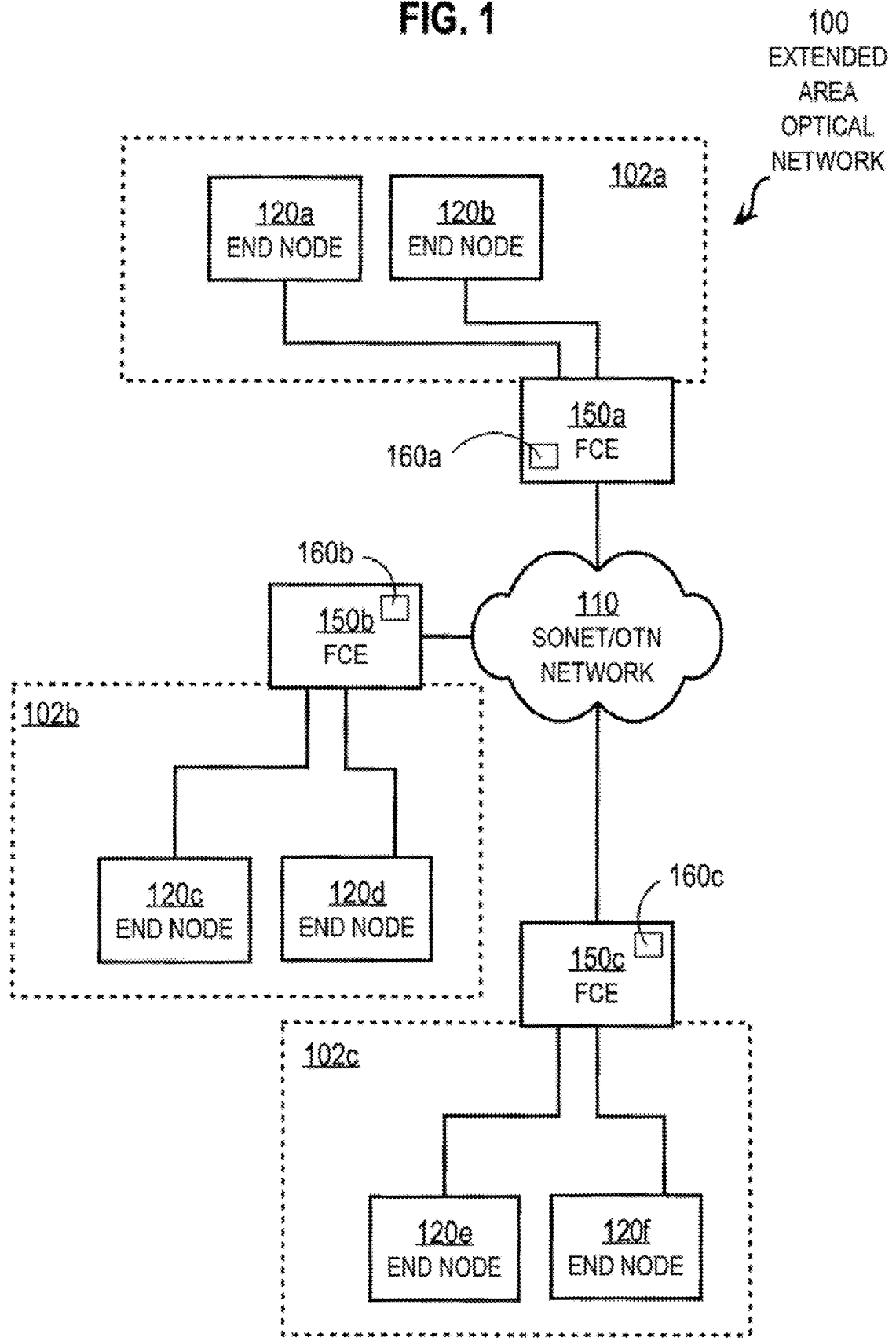
FIG. 1 is a block diagram that illustrates an extended area optical network that includes multiple local area optical networks connected across a SONET/OTN optical transport network, according to an embodiment.

FIG. 1 is a block diagram that illustrates an extended area optical network 100 that includes multiple local-area, FC optical networks 102a, 102b, 102c (collectively referenced hereinafter as FC networks 102) connected across a SONET/OTN optical transport network 110, according to an embodiment. The network 100 includes the non-local optical transport network using SONET over OTN 110 connected to the three local FC networks 102a, 102b, 102c through FC edge nodes (FCE) 150a, 150b, 150c, respectively.

A computer network is a geographically distributed collection of interconnected sub-networks for transporting data between nodes, such as computers and data storage devices. A local area network such as FC network 102a at first premises is an example of such a sub-network; and SONET/OTN network 110 is an example of another sub-network. The network's topology is defined by an arrangement of end nodes (e.g., end nodes 120a, 120b, 120c, 120d, 120e, 120f collectively referenced hereinafter as end nodes 120) that communicate with one another, typically through one or more intermediate network nodes, such as a router or switch, that facilitates routing data between end nodes 120 on different sub-networks. Intermediate network nodes depicted in FIG. 1 include FCE 150a, FCE 150b, FCE 150c, collectively referenced herein as FCE 150.

In the illustrated embodiment, the end nodes 120a, 120b are in a first FC network 102, e.g., on customer premises at a first geographic location. Similarly, the end nodes 120c, 120d are in a second FC network 102b, e.g., on customer premises at a second geographic location, unlikely to be affected by the same disaster that affects the first geographic location. Similarly, the end nodes 120e, 120f are in a third FC network 102c, e.g., on customer premises at a third geographic location, unlikely to be affected by the same disaster that affects either or both of the first two geographic locations. It is assumed for purposes of illustration that end nodes 120 are all high volume storage devices and that FC networks 102 are different local SANS that are remote from each other. In other embodiments, one or more end nodes 120 are different devices that support FC data exchange, including computers and special purpose devices.

To access a remote FC network (e.g., 102b) a particular FC network 102a is connected to FCE 150a which serves as a bridge to SONET/OTN network 110. In an illustrated embodiment, each FCE 150a, 150b, 150c includes a FC agent-GFP agent process 160a, 160b, 160c, respectively (collectively referenced hereinafter as FC-GFP agents 160). The FC-GFP agents 160 process FC frames from the local FC network and encapsulate outgoing FC frames in GFP frames for encapsulation in SONET/OTN data packets. The FC-GFP agent 160 also receives GFP frames from SONET/OTN data packets, strips the FC frame from the GFP frame payload and processes the extracted FC frame.

Although network 100 includes three local FC optical networks 102, each with two end nodes 120 connected by one FCE 150 with one FC-GFP agent 160 to communicate over one SONET/OTN optical transport network 110 for purposes of illustration, in various other embodiments, more or fewer local optical networks, end nodes, FCE and modified FC-GFP agents are included to communicate over one or more non-local optical and non-optical transport networks using the same or different protocols. In some embodiments, SONET/OTN network 110 is replaced in whole or in part with other optical extended area technologies such as SDH and Dense Wavelength Division Multiplexing (DWDM).

As described in more detail below, according to some embodiments of the invention, the FC-GFP agent 160 is a modified FC-GFP agent that ensures synchronization of the FC processing modes employed at two remote FC networks 102 communicating through the GFP frames.

2.0 Structural Overview

Figure 2:
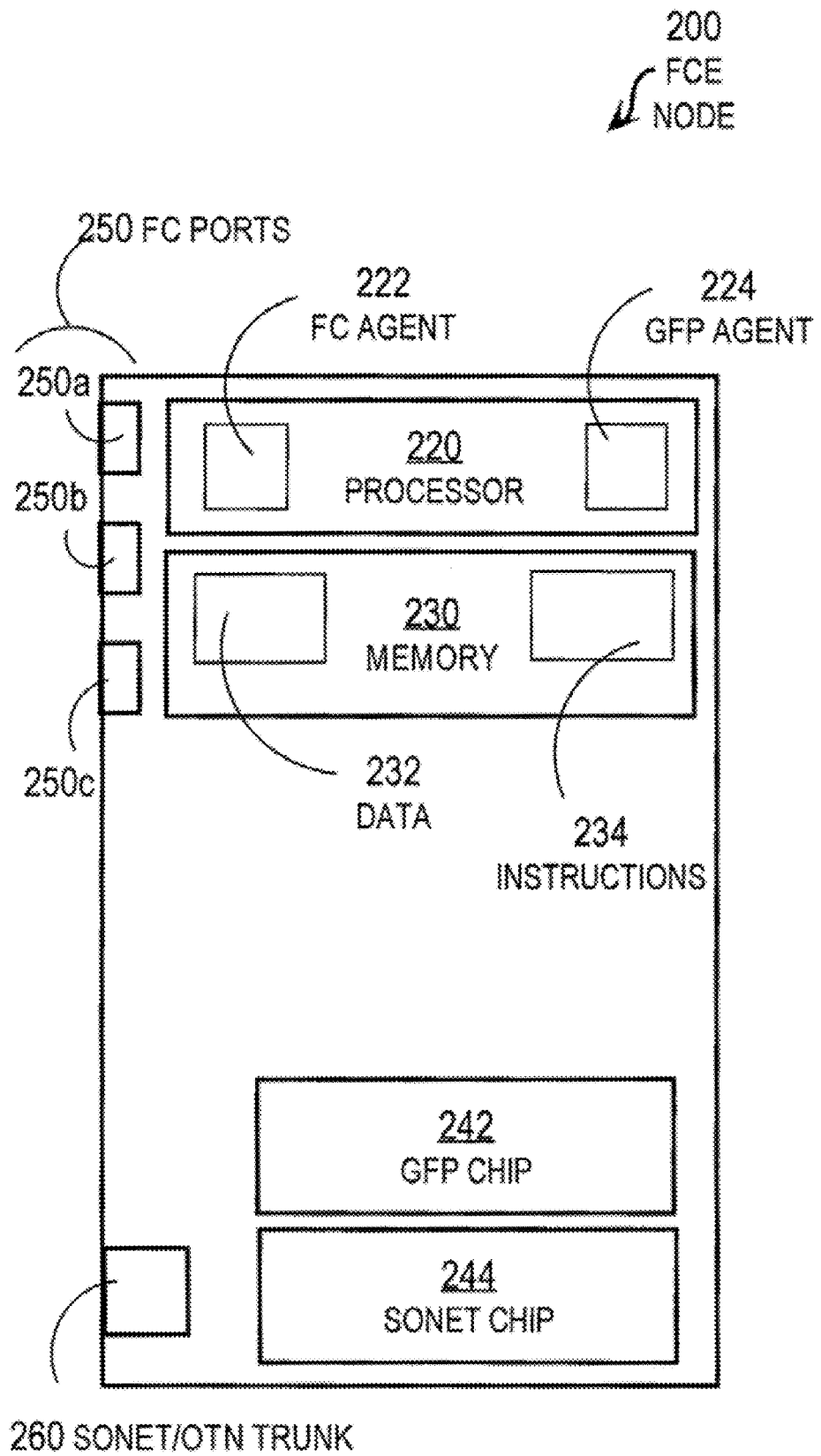
FIG. 2 is a block diagram that illustrates a FC edge node, according to an embodiment.
Figure 5:
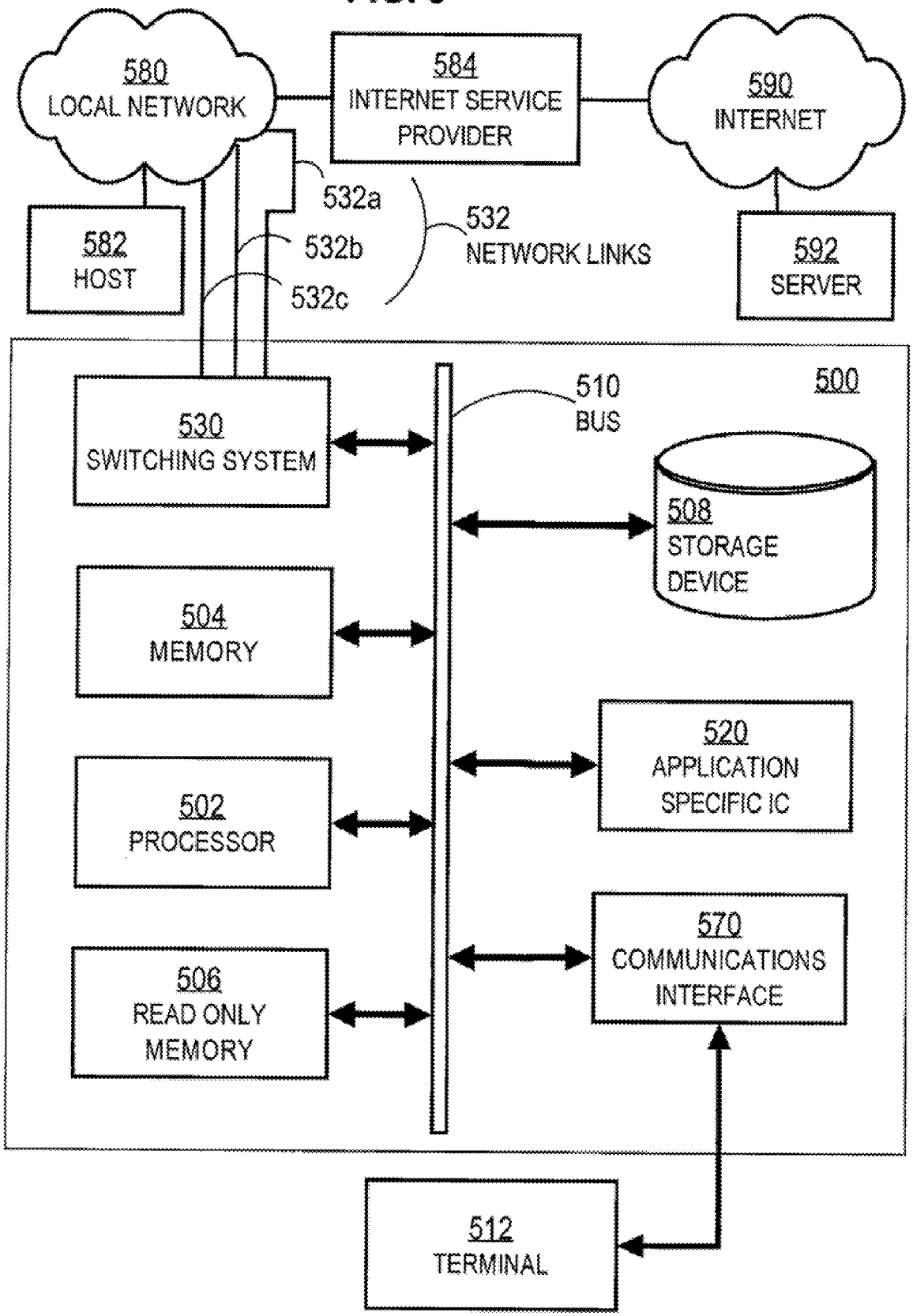
FIG. 5 is a block diagram that illustrates a computer system performing as a router upon which an embodiment of the invention may be implemented.

FIG. 2 is a block diagram that illustrates a FC edge node (FCE) 200, according to an embodiment. The FCE 200 is an intermediate network device like a router, described in more detail in a later section with reference to FIG. 5. In this section are described aspects of the FCE 200 that are involved in the illustrated embodiments. The FCE 200 includes multiple FC ports 250, including FC port 250a, FC port 250b, FC port 250c, among others, not shown. The FC edge node also includes a SONET/OTN optical trunk interface 260 which can multiplex data packets from several FC ports. FC ports 250 and trunk 260 are network interfaces on FC edge node 200 and include logic and circuitry to perform network interface functions. Although three FC ports and one optical trunk 260 are depicted in FIG. 5, in other embodiments more FC ports or optical trunks, or both, are included.

As described in more detail in a later section, with reference to FIG. 5, the FCE 200 includes a memory 230 and processor 220. Also included in FCE 200 are two Application specific integrated circuits (ASICs), including a GFP chip 242 and a SONET chip. The GFP chip is a commercially available integrated circuit widely used on edge devices connected to an optical transport network, like SONET/OTN network 110, for encapsulating data packets from an SAN into GFP for transport over the optical transport network. Similarly, the SONET chip is a commercially available integrated circuit widely used on intermediate network nodes of a SONET/OTN network 110 for performing SONET routing. Although one memory 230 and processor 220 and two ASICs are depicted in FIG. 2 for purposes of illustration, in other embodiments there are more memories or processors or both, and more or fewer ASICs.

Software operating on FCE 200 is stored as instructions 234 in memory 230, which are executed as one or more threads in processor 222. FIG. 2 depicts an FC process 222 and a GFP process 224, also called FC agent 222 and GFP agent 224, respectively, executing on processor 220 based on one or more sequences of instructions 234. The FC agent 222 processes FC frames and implements the DE processing mode, when configured to do so. The GFP agent 224 encapsulates outbound FC frames into GFP data packets and strips FC frames from inbound GFP payloads. The GFP agent also processes at least some GFP control plane payloads.

The GFP chip 242 handles GFP frames based on GFP header properties and encapsulates outgoing GFP frames into SONET payloads and strips GFP frames from inbound SONET payloads. Similarly, the SONET chip 244 handles SONET frames based on SONET header properties and encapsulates outgoing SONET frames into OTN payloads and strips SONET frames from inbound OTN payloads.

It is noted that widely available GFP chip 242 does not recognize the special header values used in prior art approaches to signal remote FC edge nodes of the DE mode of the local FCE.

Figure 3A:
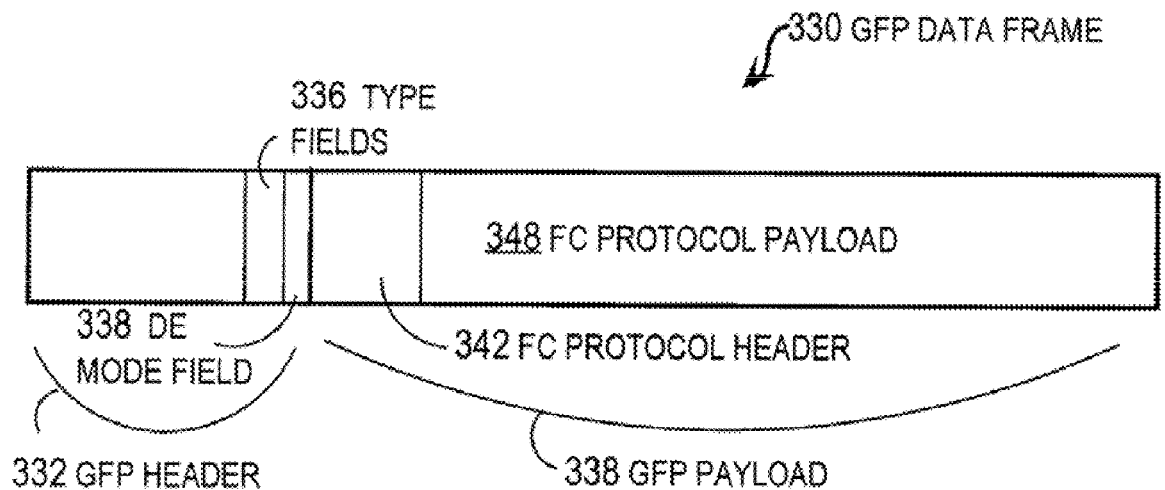
FIG. 3A is a block diagram that illustrates a GFP data frame.

FIG. 3A is a block diagram that illustrates a GFP data frame 330. In the illustrated embodiment, this GFP data frame is encapsulated in a SONET payload for communication over an optical transfer network, such as network 110. The SONET payload comprises one or more payloads of data, e.g. GFP payload 338, and FC payload 348, each encapsulated by at least one network header, e.g., GFP header 332, and FC header 342, respectively. Each header 332, 342 is formatted in accordance with a network communication protocol; header 332 is formatted according to GFP and header 342 is formatted according to the FC protocol. The FC header 342 for the FC protocol is included within the payload 338 of the GFP frame 330. As used herein, a header for a particular protocol and its payload constitute a frame for that protocol and may also be called a cell, data packet, datagram or message for that protocol.

The header for a protocol typically includes type fields that identify the protocol to which the header belongs and the next protocol in the payload, if any. For example, the GFP header 332 includes type fields 336. The GFP type fields 336 hold data that indicates that the GFP frame 330 is a data frame and the encapsulated protocol is the FC protocol. Thus the GFP payload 338 is for processing by FC agents 222 on communicating edge nodes. The header for a protocol often includes a destination address or a source address, or both, for the information in the payload.

As described above, the FC header 342 does not indicate whether the FCE edge node that sends GFP data packet 330 is using DE mode or not. In a prior approach, GFP header 332 is modified from the standard to include a DE mode field 338. The data in the DE mode field 338 indicates whether the FCE sending packet 330 is using the DE mode or not. However, GFP data packets with the DE mode field 338 are ignored by conventional GFP chips 242, and the information is not passed to a recipient FCE unless the conventional GFP chip 242 is replaced. As described in the background section, replacements of all GFP chips in an organization's SAN are expensive and often prohibitive.

Figure 3B:
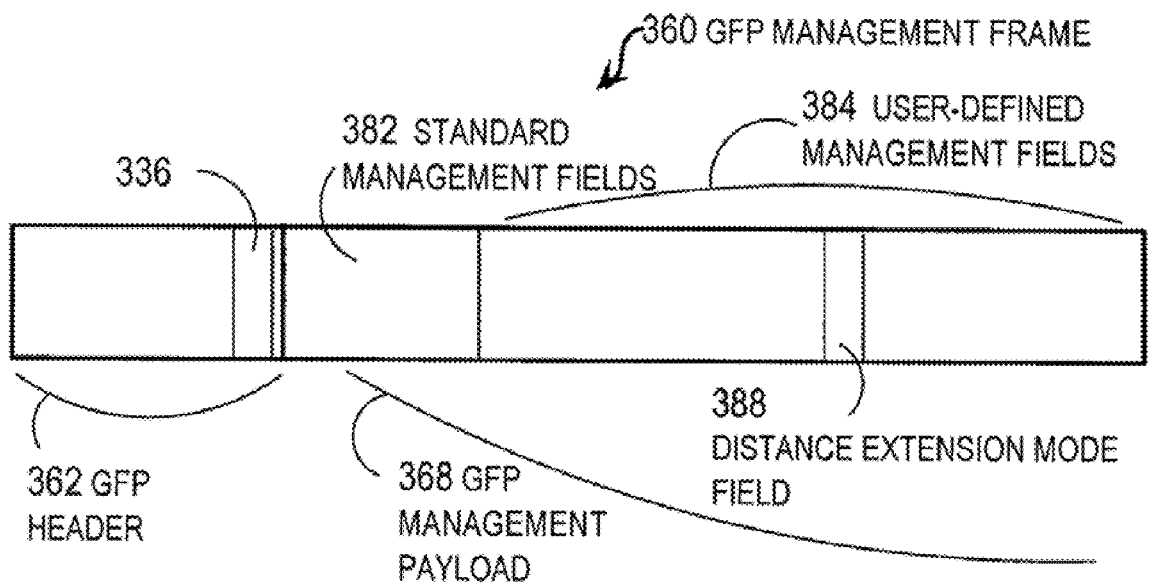
FIG. 3B is a block diagram that illustrates a GFP management (control plane) frame, according to an embodiment.

FIG. 3B is a block diagram that illustrates a GFP management (control plane) frame 360, according to an embodiment. The GFP management frame 360 is encapsulated in a SONET payload, as is the GFP data frame 330. The illustrated GFP management frame 360 includes GFP header 362 and GFP payload 368. The GFP header 362 includes dtype fields 336, as in GFP header 332. The GFP type fields 336 hold data that indicates that the GFP frame 360 is a control plane management frame. Thus the GFP payload 368 is for processing by GFP agents 224 on communicating edge nodes. In the illustrated embodiment, the GFP header 362 is a conventional GFP header that follows the GFP standard. The GFP header 362 does not include a DE mode field 338 and is not ignored by conventional GFP chips 242. According to the GFP standard, the GFP management payload 368 includes standard management fields 382 and user-defined management fields 384.

According to some embodiments of the invention, a DE mode field 388 is included in the GFP management payload 368. The DE mode field holds data that indicates whether the FC agent on the FCE that sends the GFP management frame 360 is using DE mode or not. In the illustrated embodiment, the DE mode field is included in the user-defined management fields 384. In other embodiments, the same or different field included in the GFP management payload 368 indicates other processing options for FC agents on one or both communicating FCEs.

3.0 Method at Fibre Channel Edge Node

Any method known at the time an embodiment is implemented may be used to include a DE mode field in the standard or user-defined management fields 382,384. For example, the fields in GFP management payload 368 include a new two-byte field, like the other GFP two-byte management fields. In the new field, called herein a DE mode field, a first byte indicates a near end distance extension mode and the second byte indicates a far end distance extension mode. The far end DE mode is learned from received GFP frames. The one byte values to indicate mode are chosen carefully so that multiple bit errors likely do not lead to a wrong deduction. In an illustrated embodiments, the one byte value indicating DE enabled is hexadecimal AA (binary 10101010) and the one byte value indicating DE disabled is hexadecimal 55 (binary 01010101). All eight bits must change to turn one into the other. In addition, both are even parity, so a bit error during transmission that leads to an odd parity is easily detected and rejected.

Figure 4B:
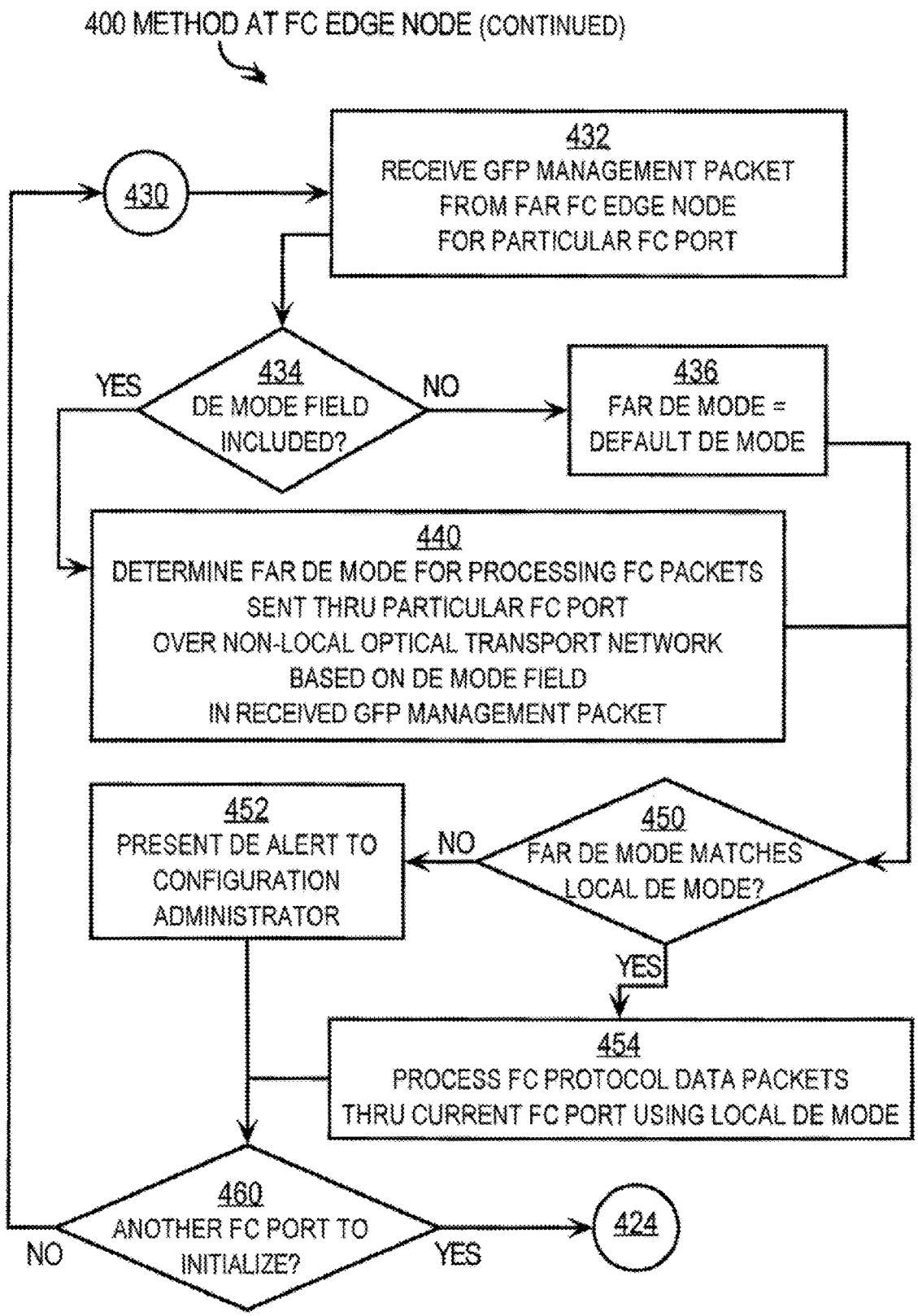

FIG. 4A and FIG. 4B constitute a flow diagram 400 that illustrates a method at an FCE for ensuring synchronized processing at remote FC networks, according to an embodiment. Although steps are shown in FIG. 4A and FIG. 4B in a particular order for purposes of illustration, in other embodiments the steps are performed in a different order, or overlapping in time by one or more processors operating in series or parallel, or one or more steps are omitted, or the method is changed in some combination of ways. For example, in some embodiments, some steps are performed by an FC agent and some steps by a GFP agent, while in other embodiments different steps are performed by the same or different agents executing on the FCEs.

In step 410, the local distance extension (DE) mode is determined for processing FC data packets sent through a particular FC port of the FCE and the optical trunk communicating with the non-local optical transport network. Any method known in the art at the time method 400 is implemented may be used. For example, it is determined from configuration data for the near end FCE that that the DE mode is enabled for FC agent 222 servicing FC port 250*a* for communications through SONET/OTN trunk 260 on near end FCE 150*a* with far end FCE 150*b*.

In step 412 a GFP management packet is formed with the local DE mode in the DE mode field. For example, data indicating DE mode enabled on FC port 250*a* is passed from FC agent 222 to GFP agent 224. GFP agent 224 includes the data indicating DE mode enabled in DE mode field 388 of a GFP management frame 360.

In step, 414, the GFP management frame is sent to the far end FCE with which the current port is to communicate. For example, the GFP management frame 360 with DE mode field 388 holding data that indicates DE mode enabled is sent to the far end FCE 150*b* with which FC port 250*a* communicates. The far end FCE processes the GFP management frame as described in FIG. 4B for the near end FCE. As a consequence, the far end FCE determines whether the processing on the far end and the near end are synchronized. If not an alert is raised.

Step 420 represents a branch point, depending on whether a GFP management frame has been received from a far end FCE. If not, control passes to step 424. In step 424 the next FC port on the near end FCE is made the current FC port and control passes back to step 410, described above, to determine whether that FC port is using DE mode or not. When the DE mode on no further ports are to be advertised in GFP management frames, in step 424, then control passes to connection point 430 to await GFP management frames for other remote FCE.

If it is determined in step 420 that a GFP management frame has been received from a far end FCE, then control passes to the steps in FIG. 4B, as indicated by the connection point 430. As depicted in FIG. 4B, connection point 430 passes control to step 432.

In step 432, a GFP management packet is received from a far end FCE associated with a particular FC port on the near end FCE. For example, a GFP management packet is received from far end FCE 150c associated with a FC port 250c on the near end FCE 150a.

In step 434, it is determined whether the DE mode field is included in the GFP management payload. For example, it is determined whether the DE mode field 388 is included in a GFP management payload 368. If not, then control passes to step 436 to deal with ignorance about the DE mode of the far end FCE.

In step 436, the far end FCE is assumed to be using a default DE mode. Either DE mode may be used as the default mode. For purposes of illustration, it is assumed that the default DE mode is DE disabled. Control then passes to step 450, described below.

If it is determined in step 434 that the DE mode field is included in the GFP management payload, then control passes to step 440. In step 440, the DE mode at the far end FCE is determined based on the contents of the DE mode field. The GFP management frame includes data that indicates the far end FCE and FC port that sent the GFP management frame. The near end FC node is configured to associate that far end FCE and FC port with a particular FC port on the near end FCE. For purposes of illustration, it is assumed that the FC port on the far end 150c is associated with FC port 250c on near end FCE 150a. It is further assumed that the data in the DE mode field 388 indicates DE enabled. In the assumed example, then, it is determined in step 440 that the DE mode is enabled for processing FC packets exchanged with the far end FCE 150c through near end FC port 250c over SONET/OTN network 110 based on the contents of field 388 in the GFP management packet 360 received from the far end FCE 150c. Control then passes to step 450.

Any method may be used to implement steps 434, 436, and 440. In some embodiments, steps 434, 436 and 440 are implemented as software changes in a GFP agent 224, so that information about the presence of the DE mode field and, if present, its contents are extracted from the GFP management frame processed by the GFP agent 224 and passed to the FC agent 222.

In step 450, it is determined whether the far end DE mode matches the near end (local) DE mode for the associated FC port. If so, control passes to step 454 to process FC data packets through the particular FC port using the local DE mode. For example, if the near end FCE 150a is configured so that DE is enabled for FC port 250c, then control passes to step 454 to process FC data using DE because that data is exchanged with a FC port on a far end FCE 150c that also has DE mode enabled. In an illustrated embodiment, steps 450 and following steps are implemented as changes to the FC agent 222.

If it is determined, in step 450, that the far end DE mode does not match the local DE mode for the associated FC port, then control passes to step 452. For example, if the local FC port 250c has DE disabled, then there is not a match with far end DE enabled processing, and control passes to step 452.

In step 452, a DE alert is presented to a configuration administrator for the near end FCE. Any method may be used to present this alert. For example, in some embodiments an email is sent to the configuration administrator. In some embodiments, an audible message is sounded or sent to voice mail. In some embodiments, a colored banner is presented on a video display or one or more light emitting diodes (LEDs) on a chassis of the local FCE. The configuration administrator is thus alerted to take remedial action, for example by changing the DE mode or configuring the FC port to be associated with a different far end FC port or FCE.

Control then passes to step 460. In step 460 it is determined whether there is another FC port to initialize by sending GFP management frames to advertise the DE mode being used. If so, control passes back to step 424 in FIG. 4A to select the next FC port on the near end FCE. If not, control passes back to connection point 430 and step 432 to process the next GFP management frame.

Using the method 400 at each FCE, FC agents can be assured that they are synchronized in using a DE mode with FC agents on remote FCEs for DE. Using similar methods, FC agents can be assured that they are synchronized in using other FC processing options. The method 400 may be implemented entirely in software so that no hardware need be changed at any FCE. Specifically, the GFP chips 242 need not be replaced at any FCE when method 400 is implemented.

4.0 Implementation Mechanisms—Hardware Overview

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, Fibre optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a Fibre optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 5 10. Bus 5 10 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for employing a Generic Framing Procedure (GFP) to transport data across an optical network between two different local area optical networks, the method comprising: forming, at a near edge node on a first local area optical network a GFP control plane message that includes a mode field that indicates a near mode of a plurality of modes for processing optical networking frames; sending the GFP control plane message to a far edge node on a second local area optical network different from the first local area optical network; and wherein the GFP control plane message, upon receipt by the far edge node, causes the far edge node to: determine whether a far mode used by the far edge node matches the near mode based on the mode field in the GFP control plane message, and if it is determined that the near mode does not match the far mode, then causing an alert that indicates a mismatch in processing between the near edge node and the far edge node.

2. The method of claim 1, wherein:
   the plurality of modes for processing optical networking frames includes a distance extension off mode and a distance extension on mode; and
   in the distance extension on mode, an edge node returns an acknowledgement message to another node on the same local area optical network as the edge node in response to receiving a optical networking data frame from the other node in order to avoid acknowledgement delays as the optical networking data frame is transmitted across the optical network.

3. The method of claim 1, wherein the optical network is an optical network that uses a Synchronous Optical Network (SONET) protocol.

4. The method of claim 1, wherein the optical network is an optical network that uses an Optical Transport Network (OTN) protocol.

5. The method of claim 1, wherein the mode field includes a user-defined field in the GFP control plane message.

6. The method of claim 1, further comprising: receiving, at the near edge node from the far edge node, a GFP control plane message that includes a mode field that holds data that indicates a far mode of the plurality of modes, wherein the far mode is used at the far edge node; determining whether a near mode used by the near edge node matches the far mode based on the mode field in the GFP control plane message; and if it is determined that the near mode does not match the far mode, then causing an alert that indicates a mismatch in processing between the near edge node and the far edge node.

7. The method of claim 6, further comprising:
   determining whether the mode field is included in the GFP control plane message; and
   wherein determining whether the near mode does not match the far mode includes determining whether the near mode does not match the far mode only if the mode field is included in the GFP control message.

8. An edge node apparatus comprising: a local area optical network interface configured to communicate via a first local area optical network; an optical transport network interface configured to: receive, from a far edge node of a second local area optical network, a GFP control plane message that includes a mode field that indicates a far mode of processing data transported across an optical network, wherein the far mode is used at the far edge node; and a processor configured to: determine, based at least in part on the mode field in the GFP control plane message, whether a near mode of processing data transported across an optical network that is employed by the edge node apparatus matches the far mode, and generate an alert that indicates a mismatch in processing between the apparatus and the far edge node, if it is determined that the near mode does not match the far mode.

9. The apparatus of claim 8, wherein the processor is further configured to: present, as part of generating the alert, an error signal to a user of the apparatus.

10. The apparatus of claim 8, wherein:
the plurality of modes includes a distance extension off mode and a distance extension on mode; and
wherein in the distance extension on mode, the local area optical network interface is configured to:
return an acknowledgement message to another node on the same local area optical network as the apparatus in response to receiving an optical networking data frame from the other node in order to avoid acknowledgement delays as the optical networking data frame is transmitted across the local area optical network.

11. The apparatus of claim 8, wherein the optical transport network is an optical network that uses a Synchronous Optical Network (SONET) protocol.

12. The apparatus of claim 8, wherein the optical transport network is an optical network that uses an Optical Transport Network (OTN) protocol.

13. The apparatus of claim 8, wherein the mode field includes a user-defined field in the GFP control plane message.

14. The apparatus of claim 8, wherein the processor is configured to:
form a second GFP control plane message that includes the mode field that indicates a near mode of the plurality of modes; and
wherein the optical transport network interface is configured to:
transmit the second GFP control plane message through the optical transport network interface to a far edge node,
wherein the second GFP control plane message causes the far edge node to:
determine, based at least in part on the mode field in the second GFP control plane message, whether the far mode of processing data transported across an optical network that is employed by the far edge node matches the far mode employed by the apparatus.

15. The apparatus of claim 8, wherein the processor is configured to:
determine whether the mode field is included in the GFP control plane message; and
determine whether the near mode does not match the far mode only if the mode field is included in the GFP control message.

16. An apparatus for employing a Generic Framing Procedure (GFP) to transport data across an optical network between two different local area optical networks, the apparatus comprising: means for forming, at a near edge node on a first local area optical network a GFP control plane message that includes a mode field that indicates a near mode of the plurality of modes for processing optical networking frames; and means for sending the GFP control plane message to a far edge node on a second local area optical network different from the first local area optical network; and wherein the GFP control plane message, upon receipt by the far edge node, causes the far edge node to: determine whether a far mode used by the far edge node matches the near mode based on the mode field in the GFP control plane message, and if it is determined that the near mode does not match the far mode, then causing an alert that indicates a mismatch in processing between the near edge node and the far edge node.

17. The apparatus of claim 16, wherein:
the plurality of modes for processing optical networking frames includes a distance extension off mode and a distance extension on mode; and
wherein the apparatus further comprises:
means for returning, in the distance extension on mode, an acknowledgement message to another node on the same local area optical network as the apparatus in response to receiving an optical networking data frame from the other node in order to avoid acknowledgement delays as the optical networking data frame is transmitted across the optical network.

18. The apparatus of claim 16, wherein the mode field includes a user-defined field in the GFP control plane message.

19. The apparatus of claim 16, further comprising:
means for receiving, at the apparatus from the far edge node, a GFP control plane message that includes a mode field that holds data that indicates a far mode of the plurality of modes, wherein the far mode is used at the far edge node;
means for determining whether a near mode used by the near edge node matches the far mode based on the mode field in the GFP control plane message; and
means for causing, if it is determined that the near mode does not match the far mode, an alert that indicates a mismatch in processing between the apparatus and the far edge node.

* * * * *